UNITED STATES PATENT OFFICE.

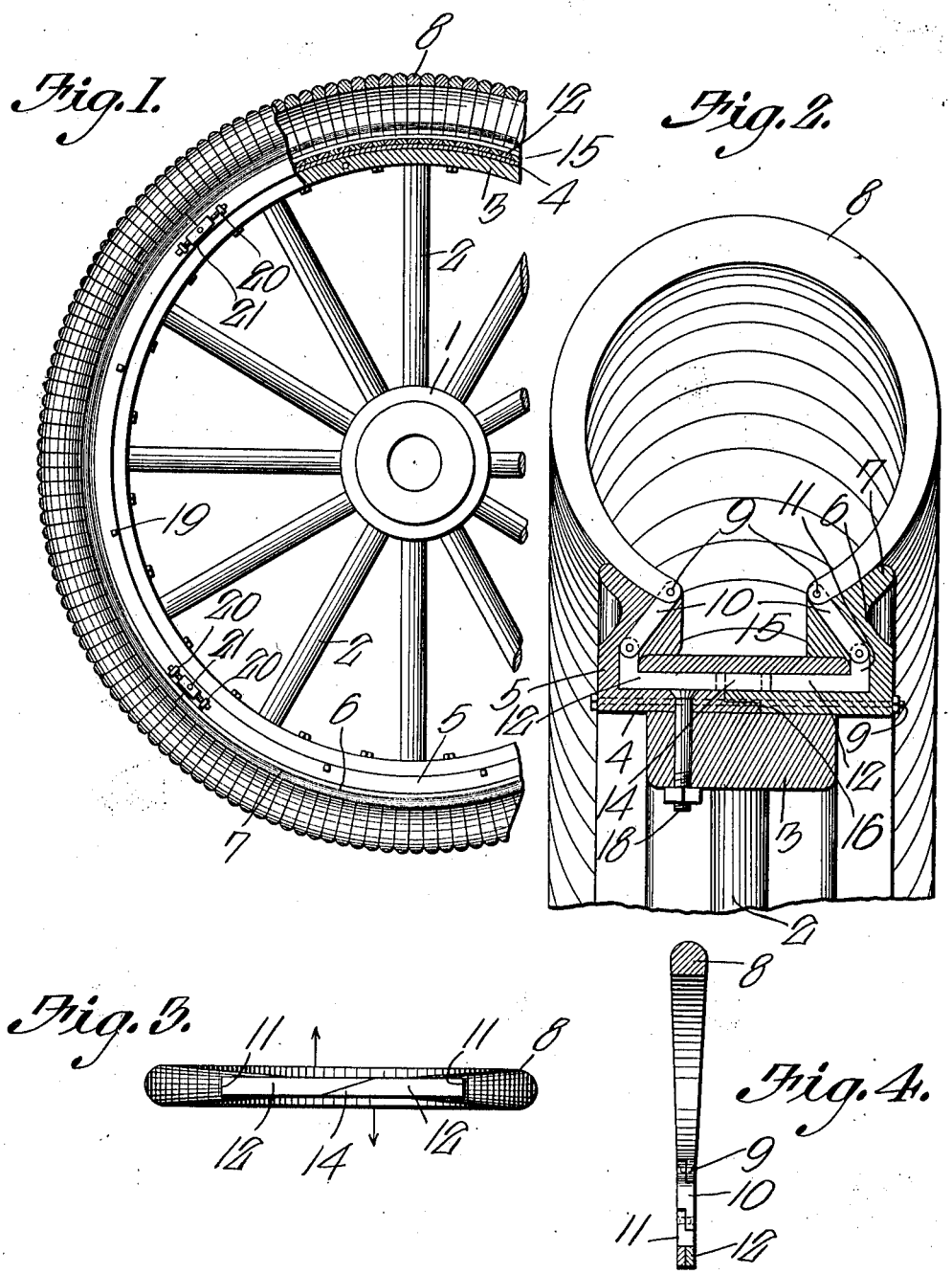

WILHELM A. GIERMANN, OF BLENCOE, IOWA.

VEHICLE-TIRE.

1,021,246.   Specification of Letters Patent.   Patented Mar. 26, 1912.

Application filed October 11, 1911. Serial No. 654,145.

*To all whom it may concern:*

Be it known that I, WILHELM A. GIERMANN, a citizen of the United States, residing at Blencoe, in the county of Monona and State of Iowa, have invented a new and useful Vehicle-Tire, of which the following is a specification.

It is the object of the present invention to provide a spring wheel which will present a tread surface of great tractive power.

A further object of the invention is to provide a wheel in which the assemblage of the constituent parts of the rim will serve to bind together, circumferentially of the wheel, a series of connecting members wherewith the tire is pivotally united.

With the foregoing and other objects in view, which will appear as the description proceeds, the invention resides in the combination and arrangement of parts and in the details of construction hereinafter described and claimed, it being understood that changes in the precise embodiment of invention herein disclosed can be made without departing from the spirit of the invention.

In the accompanying drawings,—Figure 1 shows in side elevation, a portion of a wheel constructed in accordance with the present invention, parts being broken away; Fig. 2 is a radial section of the device; Fig. 3 is a bottom plan showing one pair of connecting members together with the arched tread spring which is connected with these members; and Fig. 4 is a section through one of the arched tread springs and its attendant parts.

In the accompanying drawings, the numeral 1 denotes the hub of the wheel, the numeral 2 denotes the spokes, and the numeral 3 denotes the felly which is carried by the spokes, the felly being preferably, although not necessarily, fashioned from wood.

The rim comprises a pair of separable parts, each part including a base 4 adapted to rest upon the felly 3. The base 4 is equipped with an outstanding shoulder 5, disposed at right angles to the base 4, each shoulder 5 merging into a lip 6, extended toward the median plane of the wheel, each lip 6 having a flange 7, extended away from the median plane of the wheel.

The invention further includes a plurality of arched tread springs 8, the ends of which rest upon the flanges 7. As shown at 9, the inner ends of the springs 8 are pivotally connected with links 10, adapted to lie against the lips 6. The links 10 are pivotally connected with the secondary arms 11 of the connecting members, the arms 11 resting against the shoulders 5. The arms 11 are formed integrally with primary arms 12, the arms 12 of the connecting members resting upon the base portions 4 of the rim-forming parts. As shown at 14, the ends of the arms 12 are overlapped, and beveled, the arms 12 being of less diameter than the tread portions of the springs 8.

The numeral 15 indicates a strap which extends circumferentially of the wheel, the strap fitting at its edges, against the arms 11 of the connecting members, the strap inclosing the arms 12 of the connecting members, to bind the same against the base portions 4 of the rim-forming elements.

The meeting edges of the bases 4 of the rim-forming elements are halved together, as shown at 16. The base portion 4 of one of the rim-forming elements is united with the felly 3 by means of a bolt and nut structure 18. Through the bases 4 of the rim-forming elements, a series of bolt and nut connections 19 are extended. Circumferentially of the wheel, the rim-forming members may be divided into any number of segments, these segments carrying lugs 20 adjacent their ends, united by a turn buckle 21.

In assembling the device, the left hand part of the rim, referring particularly to Fig. 2, is placed upon the felly 3. The bolt portion of the structure 18 is inserted through the felly 3 and through the base 4 of the left hand part of the rim. The outer end of the bolt is riveted down upon the base 4, and the nut is applied to the bolt. The tire, comprising the tread springs 8, is then mounted in place, arms 12 extending transversely of the left hand part of the rim, and strap 15 resting upon the arms 12. The portions 11 of the connecting members are spaced from the edges of the strap 15. The right hand portion of the rim, referring to Fig. 2, is then slid into place upon the felly 3, beneath the arms 12. The bolt and nut connections 19 are then applied. When the parts of the rim are drawn together, transversely of the rim, the arms 12 of the connecting members will be thrust in opposite directions, as indicated by the arrows in Fig. 3, so that each set of connecting members will be in lateral abutment with the adjoining sets of connecting members.

Owing to the peculiar manner in which the arms 11 and 12 of the connecting members fit into the rim-forming elements, and owing to the fact that the links 10 are engaged by the lips 6 of the rim-forming elements, the tire, comprising the springs 8, will be held securely in place, the strap 15 obviously serving to increase the security of the structure.

Having thus described the invention, what is claimed is:—

1. In a device of the class described, a felly; a rim comprising separable parts each including a base adapted to rest upon the felly and having an outstanding shoulder provided with a lip extended toward the median plane of the wheel, the lip having a flange extended away from the median plane of the wheel; arched tread springs resting against the flanges; links pivoted to the ends of the springs and resting against the lips; connecting members comprising primary arms resting upon the bases of the tread parts and upstanding secondary arms resting against the shoulders, the secondary arms being pivotally connected with the links, and the ends of the primary arms being overlapped and beveled; a securing element uniting the base of one rim part with the felly; and a securing element uniting the bases of the rim parts; and a strap engaged over the primary arms of the connecting members and fitting against the secondary arms of the connecting members.

2. In a device of the class described, a trough-shaped rim; connecting members resting upon the rim; arched tread springs resting upon the rim; links uniting the connecting members with the springs and normally resting against the rim; and a strap extended across the connecting members to bind the same upon the rim.

3. In a device of the class described, a rim comprising separable parts; connecting members located within the rim and having overlapped, beveled ends; tread springs supported by the rim; links uniting the tread springs with the connecting members; and a securing element extended through the parts of the rim, to draw said parts together and to cause the beveled ends of the connecting members to co-act, whereby each connecting member will move, adjacent its beveled ends, into contact with an adjoining connecting member.

4. In a device of the class described, a rim comprising separable parts; connecting members extended transversely of the rim, the connecting members having beveled, overlapped ends; a tire united with the connecting members; and means for drawing the parts of the rim together, whereby the beveled faces of the connecting members will cause said ends to move circumferentially of the tire into engagement with the beveled ends of other, adjacent, like connecting members.

In testimony that I claim the foregoing as my own, I have hereto affixed my signature in the presence of two witnesses.

WILHELM A. GIERMANN.

Witnesses:
ODIE E. WARNER,
I. T. HATHEWAY.

---

Copies of this patent may be obtained for five cents each, by addressing the "Commissioner of Patents, Washington, D. C."